Nov. 23, 1948.        B. G. CARLSON         2,454,551
SERVO UNIT
Filed March 2, 1945

INVENTOR.
BERT G. CARLSON
BY
Frank H Harmon
ATTORNEY

Patented Nov. 23, 1948

2,454,551

UNITED STATES PATENT OFFICE 2,454,551

SERVO UNIT

Bert G. Carlson, Gates Mills, Ohio, assignor to William R. Jack, Cleveland, Ohio Application March 2, 1945, Serial No. 580,608

4 Claims. (Cl. 121—38)

This invention relates to improvements in hydraulic servomotor units and has for one of its primary objects to provide a simple and efficient self-contained servomotor unit employing a servo cylinder and a piston hydraulically operated therein by fluid pressure leads on either side of the piston with a single valve means that is hydraulically operated to function as a combined by-pass, overpower and on-off valve to replace the several valves usually present in servo units, particularly those used in connection with automatic pilots.

With the foregoing and other objects in view the invention resides in the combination of parts and in the details of construction hereinafter set forth in the following specification and appended claims, certain embodiments thereof being illustrated in the accompanying drawings, in which:

Figure 1:
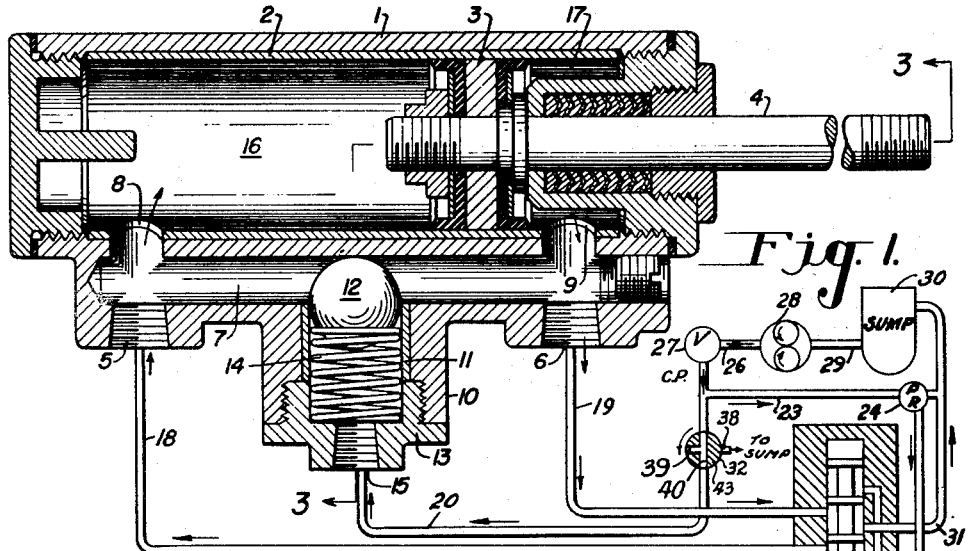
Figure 1 is a view in longitudinal section taken through the servomotor unit showing the servo piston hard over to the right end of the cylinder and showing diagrammatically the hydraulic system connected to the servomotor unit.

Referring more particularly to the drawings, the casing 1 is provided with the usual smooth bore cylinder liner 2 in which the piston 3 is mounted to be reciprocated. The piston rod 4 is connected by suitable means to the work desired to be done such as to the control cables for operating the control surfaces of an aircraft.

Heretofore, in automatic pilot systems such as shown in the United States patents to Kenyon, No. 2,210,916 and 2,210,917 of August 13, 1940, it has been conventional practice to have a fluid pressure lead from the balanced oil valve to either side of the servo piston and a valve controlled by-pass in the servo unit between the two pressure leads. This conventional valve control involves a plurality of spring operated overpower valves and a manually operated "on-off" valve.

The two operating pressure lines 18 and 19 from the balanced oil valve 21 in casing 22 are connected respectively to the unit to threaded apertures 5 and 6 leading to a by-pass passage 7 and respectively through cylinder ports 8 and 9 to cylinder chambers 16 and 17 on the respective sides of the servo piston.

The lower mid-portion 10 of the casing is provided with a bore to receive a bushing 11 to slidably receive a ball 12 in fairly snug relationship. Body portion 10 is screw threaded to receive a plug 13 between the bottom of which and the ball 12 is disposed a compression coil spring 14. The plug 13 is centrally bored which bore 15 is screw threaded to receive a lead 20 from a fluid pressure source of the hydraulic system.

Lead 20 connects with lead 23 through pressure regulator 24 to lead 25 into casing 22. Lead 20 also communicates with lead 26 through constant pressure valve 27 and through pump 28 through lead 29 to sump 30. Another lead 31 extends from casing 22 to sump 30. The flow through lead 20 is controlled in an on or off, or by-pass, position by a three-way valve 32.

The strength of the spring 14 is relatively small and only relied upon to maintain little more if any than the actual weight of the ball 12. Under the control of any suitable "three-way" valve 32 which is turned on to supply pressure from the hydraulic system through opening 15 the ball 12 remains seated in a fluid tight relationship, as shown in Figure 1, to close the by-pass 7 between openings 5 and 6 and 8 and 9 of cylinder chambers 16 and 17. The bore of the bushing 11 is relatively greater than that of the by-pass 7 so that while the unit hydraulic pressure is uniform through opening 15 as compared to that in opening 5 or 6 as transmitted to by-pass 7, the over-all pressure on the greater exposed surface of ball 12 in bushing 11 is greater than that on the lesser exposed surface of the ball in by-pass 7 so as to maintain the ball 12 in its position of Figure 1 to close by-pass 7.

As long as ball 12 keeps by-pass 7 closed the servo piston operates hydraulically in its cylinder. For instance, Figure 1 shows the piston forced out of normal neutral position to one hard over to the right. This condition has been brought about by the automatic hydraulic unequalization of pressure within cylinder chambers 16 and 17. This, in turn has been caused by a pressure differential in pressure lines leading in at 5 and 6. Thus as a pressure differential has occurred in the automatic pilot balanced oil valve to open pressure flow in the line leading in at 5 and to close the pressure flow to the line leading in at 6, the latter becomes the drain or return flow line, as indicated by the arrows. The movement of the piston to this position also moves the piston rod to do its work, such as operating the control surface of an aircraft.

If the pressure line leading in at 15 is valved to cut off the supply of hydraulic pressure, the ball valve 7 is then maintained in a position to close by-pass 12 only by spring 14 whose strength is only sufficient to support the weight of the ball. Any residual pressures tending to remain in line 20, are removed by the sump lead 38 from valve 32 as passages 39 and 40 of said valve are brought into alignment with leads 20 and 38 respectively by the counterclockwise closing movement of rotary element 43 in valve 32. Thus, the creation of any appreciable pressure differential in the two lines 5 and 6 or the two cylinder chambers causes the ball 12 to become depressed against the slight action of spring 14 and open the by-pass 7 to render the servo ineffective as such. This constitutes ball 12 an "on-off" valve, as far as the unit is concerned.

Figure 2:
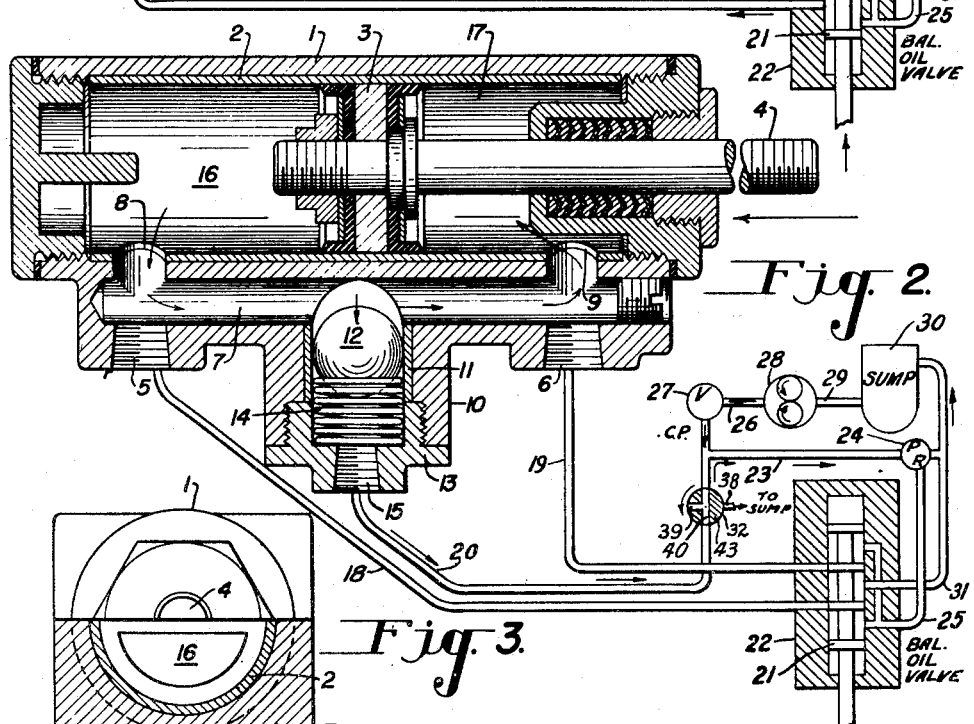
Figure 2 is a similar view showing the piston substantially midway between the cylinder ends and the overpower ball valve depressed and the by-pass between the two hydraulic power lines opened.
Figure 3:
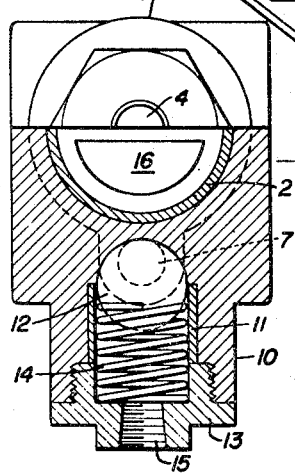
Figure 3 is a view in section taken along line 3—3 of the servomotor unit of Figure 1.

Should the aircraft operator desire to operate the manual control mechanism for operating the aircraft control surfaces through the servo unit without first neutralizing the same by cutting off hydraulic pressure in the line leading in at 15 this may be done which results in the manual movement of piston rod 4 in the appropriate direction. Figure 2 shows the relative positions of the piston and ball, and by arrows the hydraulic flow which occurs as piston rod 4 is manually moved to the left from its position of Figure 1 to that of Figure 2 and further. In its neutral position the piston has equal pressure force at 5, 6 and 15 with the lands of the balanced oil valve closing the lines 18 and 19 to the servo piston as shown in Figure 2. By a movement of the spool in the balanced oil valve as shown in Figure 1, the lands connect line 18 to the pressure side and line 19 to the drain or return side of the pressure system while the hydraulic pressure in line 20 keeps the ball 12 seated in by-pass 7. This causes a pressure differential in chamber 16 which forces piston 3 to the right, as shown in Figure 1.

Movement of the spool in the opposite direction in the balanced oil valve would reverse the pressure side to line 19 and chamber 17 causing the piston to move to the left forcing the fluid out of chamber 16 into line 18 and thereby into the return side of the pressure system while ball 12 still remains seated in by-pass 7.

Should the operator want to overpower the system manually without turning the on-off valve off he could move the piston rod to the left and cause a difference of pressure in chamber 16 which would force the fluid into the by-pass chamber 7 (as lines 18 and 19 are of equal pressure) and depress the ball 12 into the bushing 11 thereby overcoming the upward hydraulic pressure on ball 12 causing an opening in by-pass 7 to allow the fluid into chamber 17. The fluid in line 20 would be forced back into the pressure regulator and thereby into the sump.

Due to there being only an inch and three-fourths stroke in the piston as chamber 16 is being evacuated of fluid and there not being the same displacement area in chamber 17 (due to the piston rod) the ball 12 will be forced down further into bushing 11 to take the excess fluid in that cycle of the stroke. As distinguished from the usual two overpower valves conventionally used which rely entirely on spring pressure to keep them normally closed and which springs are susceptible to unequal strength and variations due to thermal changes, the ball 12 is a single valve dependent only upon the hydraulic pressure in the hydraulic system to function reliably and efficiently as a virtually springless combined by-pass, "on-off" and overpower servomotor unit valve.

I claim:

1. In a servomotor unit, a power cylinder and a piston reciprocally mounted therein, a source of hydraulic pressure with leads to said unit and through cylinder ports to cylinder chambers on either side of said piston, a by-pass between said pressure leads, an intermediate lead in said unit from said hydraulic pressure source, a ball valve slidably mounted in said lead and extending into said by-pass in a fluid tight relationship with said by-pass, said intermediate lead being of greater cross-sectional area than that of said by-pass to permit the exertion of a relatively greater over-all hydraulic pressure to maintain said ball valve closed, said ball valve being adapted to be opened upon the existence of an abnormal pressure in said by-pass in excess of that in said intermediate lead.

2. In a servomotor unit, a power cylinder and a piston reciprocally mounted therein, a source of hydraulic pressure with leads to said unit and through cylinder ports to cylinder chambers on either side of said piston, a by-pass between said pressure leads, an intermediate lead in said unit from said hydraulic pressure source, a ball valve slidably mounted in said lead and extending into said by-pass in a fluid tight relationship with said by-pass, said intermediate lead being of greater cross-sectional area than that of said by-pass to permit the exertion of a relatively greater over-all hydraulic pressure to maintain said ball valve closed, said ball valve being adapted to be opened upon the existence of an abnormal pressure in said by-pass in excess of that in said intermediate lead, and valve means for cutting off and on the supply of hydraulic pressure to said ball valve.

3. In a servomotor unit, a power cylinder and a piston reciprocally mounted therein, a source of hydraulic pressure with leads to said unit and through cylinder ports to cylinder chambers on either side of said piston, a by-pass between said pressure leads, an intermediate lead in said unit from said hydraulic pressure source, a ball valve slidably mounted in said lead and extending into said by-pass in a fluid tight relationship with said by-pass, said intermediate lead being of greater cross-sectional area than that of said by-pass to permit the exertion of a relatively greater over-all hydraulic pressure to maintain said ball valve closed, said ball valve being adapted to be opened upon the existence of an abnormal pressure in said by-pass in excess of that in said intermediate lead, created by the manual operation of said piston in opposition to the existing normal hydraulic pressures in said cylinder chambers.

4. In a servomotor unit, a power cylinder and a piston reciprocally mounted therein, a source of hydraulic pressure with leads to said unit and through cylinder ports to cylinder chambers on either side of said piston, a by-pass between said pressure leads, an intermediate lead in said unit from said hydraulic pressure source, a ball valve slidably mounted in said lead and extending into said by-pass in a fluid tight relationship with said by-pass, said intermediate lead being of greater cross-sectional area than that of said by-pass to permit the exertion of a relatively greater over-all hydraulic pressure to maintain said ball valve closed, said ball valve being adapted to be opened upon the existence of an abnormal pressure in said by-pass in excess of that in said intermediate lead, created by the manual operation of said piston in opposition to the existing normal hydraulic pressures in said cylinder chambers, and valve means for normally maintaining a supply of hydraulic pressure to said ball valve and for cutting of said supply to permit hydraulic operation of said ball valve into a position to open said bypass to render said servo ineffective upon the presence of any appreciable shift of hydraulic pressure differential in said cylinder.

BERT G. CARLSON.

REFERENCES CITED

The following references are of record in the file of this patent:

UNITED STATES PATENTS

| Number | Name | Date |
| --- | --- | --- |
| 833,931 | Johnson | Oct. 23, 1906 |
| 2,069,214 | Carlson | Feb. 2, 1937 |
| 2,179,179 | Fischel | Nov. 7, 1939 |
| 2,283,541 | Dodson | May 19, 1942 |